US009727449B2

(12) United States Patent
Hermeto et al.

(10) Patent No.: US 9,727,449 B2
(45) Date of Patent: Aug. 8, 2017

(54) CONDUCTING PERFORMANCE SNAPSHOTS DURING TEST AND USING FEEDBACK TO CONTROL TEST BASED ON CUSTOMER EXPERIENCE PARAMETERS

(71) Applicant: Spirent Communications, Inc., Sunnyvale, CA (US)

(72) Inventors: Guilherme Hermeto, Allen, TX (US); Brian Buege, Dallas, TX (US)

(73) Assignee: Spirent Communications, Inc., San Jose, CA (US)

( * ) Notice: Subject to any disclaimer, the term of this patent is extended or adjusted under 35 U.S.C. 154(b) by 138 days.

(21) Appl. No.: 14/587,997

(22) Filed: Dec. 31, 2014

(65) Prior Publication Data

US 2016/0188445 A1    Jun. 30, 2016

(51) Int. Cl.
| | |
|---|---|
| G06F 11/36 | (2006.01) |
| H04L 12/26 | (2006.01) |
| H04L 12/24 | (2006.01) |
| H04L 12/801 | (2013.01) |

(52) U.S. Cl.
CPC ...... *G06F 11/3684* (2013.01); *G06F 11/3688* (2013.01); *G06F 11/3692* (2013.01); *H04L 41/5038* (2013.01); *H04L 41/5067* (2013.01); *H04L 43/06* (2013.01); *H04L 43/062* (2013.01); *H04L 43/067* (2013.01); *H04L 43/50* (2013.01); *H04L 43/045* (2013.01); *H04L 47/19* (2013.01)

(58) Field of Classification Search
CPC ............ G06F 11/3414; G06F 11/3433; G06F 11/3457; G06F 11/3688

USPC ........................................................ 714/47.2
See application file for complete search history.

(56) References Cited

U.S. PATENT DOCUMENTS

| | | | | |
|---|---|---|---|---|
| 6,519,714 | B1 * | 2/2003 | Sweet ................. | G06F 11/3414 709/203 |
| 8,977,739 | B2 * | 3/2015 | Troup ................. | G06F 11/2294 709/224 |

(Continued)

OTHER PUBLICATIONS

Spirent Axon, "Spirent® Axon, Easy. Affordable Practical, brochure" 2013, Spirent Communications, Inc., 4 pages.

(Continued)

*Primary Examiner* — Chae Ko
(74) *Attorney, Agent, or Firm* — Ernest J. Beffel, Jr.; Haynes Beffel & Wolfeld LLP

(57) ABSTRACT

The technology disclosed enables understanding the user experience of accessing a web page under high loads. A testing system generates a simulated load by retrieving and loading a single web object. A performance snapshot is taken of accessing an entire web page from the server under load. The performance snapshot may be performed by emulating a browser accessing a web page's URL, the web page comprising multiple objects that are independently retrieved and loaded. The simulated load is configured with a number of users per region of the world where the user load will originate, and a single object from the web page to retrieve. Performance data such as response time for the single object retrieved, number of hits per second, number of timeouts per sec, and errors per second may be recorded and reported. An optimal number of users may be determined to achieve a target user experience goal.

25 Claims, 12 Drawing Sheets

Performance Snapshot and Performance Test

(56) References Cited

U.S. PATENT DOCUMENTS

| | | | | |
|---|---|---|---|---|
| 2002/0198984 | A1* | 12/2002 | Goldstein | G06F 11/323 709/224 |
| 2003/0051064 | A1* | 3/2003 | Curtis | G06F 9/546 719/313 |
| 2003/0065986 | A1* | 4/2003 | Fraenkel | G06F 11/3006 714/47.2 |
| 2003/0091165 | A1* | 5/2003 | Bearden | H04L 12/2697 379/88.08 |
| 2003/0120464 | A1* | 6/2003 | Taft | G06F 17/30899 702/186 |
| 2003/0233445 | A1* | 12/2003 | Levy | H04L 43/0852 709/224 |
| 2004/0111727 | A1* | 6/2004 | Schwarzbauer | G06F 11/36 719/310 |
| 2005/0177613 | A1* | 8/2005 | Dresden | G06F 17/30873 709/200 |
| 2008/0320076 | A1* | 12/2008 | Silvert | G06F 11/3668 709/203 |
| 2010/0281208 | A1* | 11/2010 | Yang | G06F 3/0611 711/103 |
| 2011/0015917 | A1* | 1/2011 | Wang | G06F 9/455 703/23 |
| 2011/0054878 | A1* | 3/2011 | Zhang | G06F 11/3419 703/21 |
| 2012/0137059 | A1* | 5/2012 | Yang | G06F 3/0611 711/104 |
| 2012/0173870 | A1* | 7/2012 | Reddy | H04L 63/0428 713/153 |
| 2012/0246310 | A1* | 9/2012 | Broda | G06F 11/3495 709/224 |
| 2013/0198391 | A1* | 8/2013 | Weissblum | H04L 63/306 709/227 |
| 2013/0275585 | A1* | 10/2013 | Santhanakrishnan | G06F 11/3476 709/224 |
| 2014/0289418 | A1* | 9/2014 | Cohen | G06F 11/3688 709/226 |
| 2015/0120914 | A1* | 4/2015 | Wada | H04L 43/04 709/224 |
| 2016/0034381 | A1* | 2/2016 | Keret | G06F 11/3672 717/124 |
| 2016/0147643 | A1* | 5/2016 | Hamon | G06F 11/3664 717/134 |
| 2016/0191349 | A1* | 6/2016 | Buege | H04L 41/5038 709/224 |

OTHER PUBLICATIONS

Spirent, "Test Reference—Network Infrastructure Tests," Jun. 26, 2014, Spirent Communications, Inc.,<https://support.spirentforbusiness.com/support/solutions/articles/1000009746-test> Retrieves, Oct. 11, 2014, 17 pages.

Spirent Axon, "Application Note—Testing Made Simple," 2014, Spirent Commuincations, Inc., <www.spirent.com>, pp. 1-18.

Spirent, "Support: Spirent Enterprise Customer Portal," 2014, Spirent Communications, Inc., <https://support.spirentforbusiness.com/support/home>, retrieved Oct. 11, 2014, 5 pages.

Spirent, "Scenarios:Spirent Enterprise Customer Portal," 2014, Spirent Communications, Inc., <https://support.spirentforbusiness.com/support/solutions/folders/1000034456>, retrieved Oct. 11, 2014, 10 pages.

Spirent, "Enable the new Traffic Recorder (beta): Spirent Enterprise Customer Portal," Jun. 26, 2014, Spirent Communications, Inc., <https://support.spirentforbusiness.com/support/solutions/articles/1000026580-enable-the-new-traffic-recorder>, Retrieved Oct. 12, 2014, 1 page.

Spirent, "How to enable the NetFlow probe: Spirent Enterprise Customer Portal," Apr. 2, 2014, Spirent communications, Inc., <https://support.spirentforbusiness.com/support/solutions/articles/1000020325-how-to-enable-the-netflow>, Retrieved Oct. 12, 2014, 2 pages.

* cited by examiner

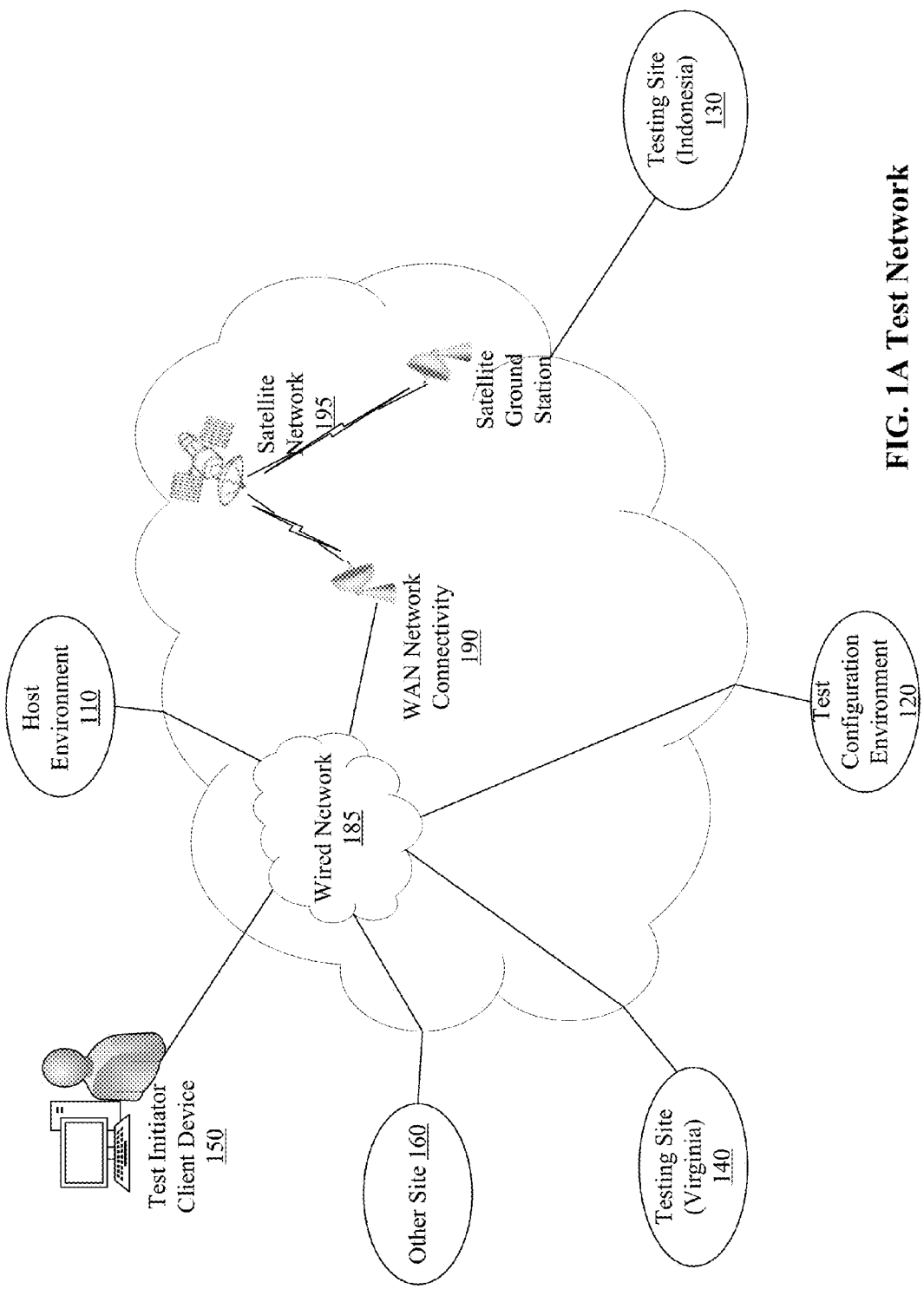
FIG. 1A Test Network

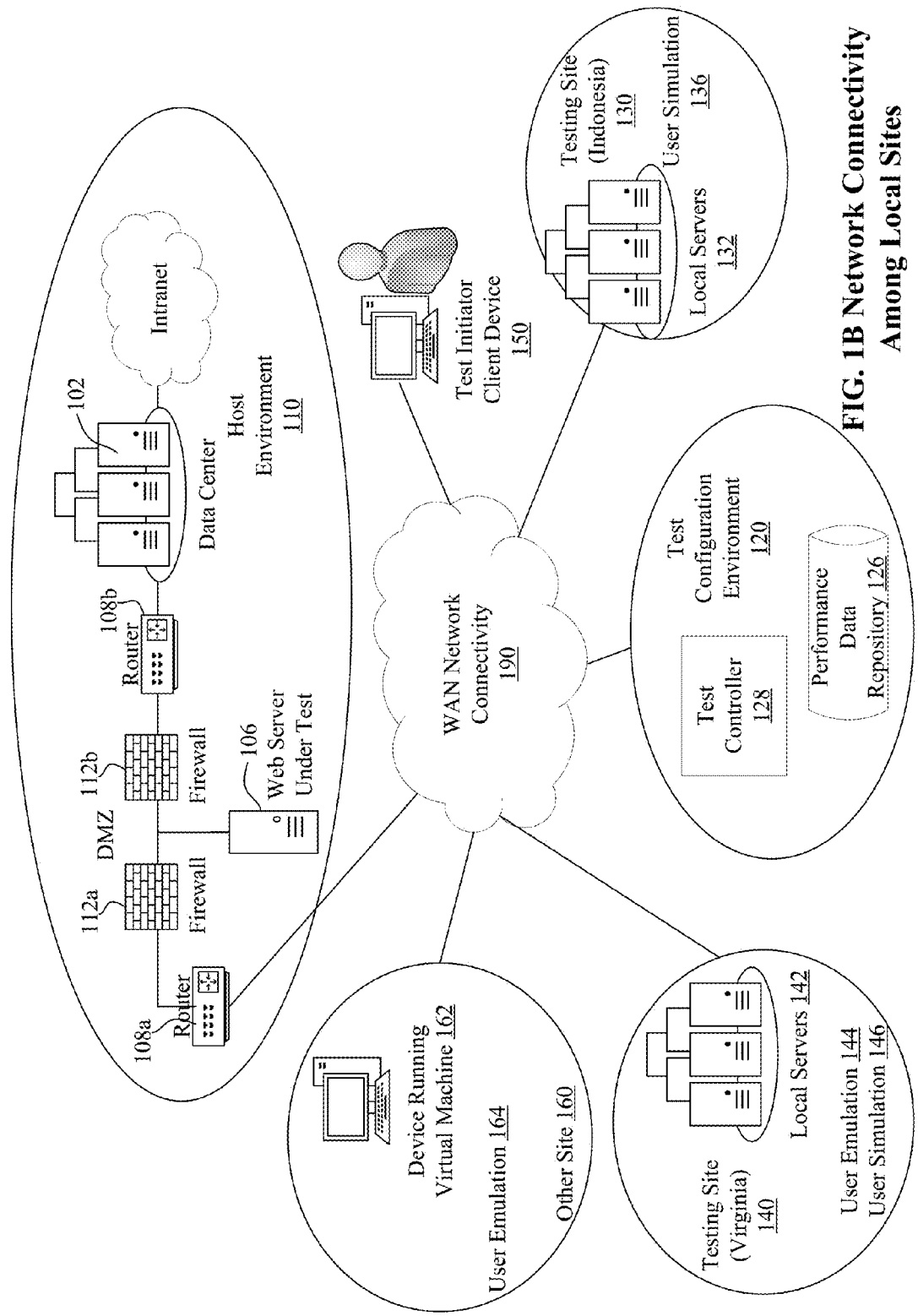
FIG. 1B Network Connectivity Among Local Sites

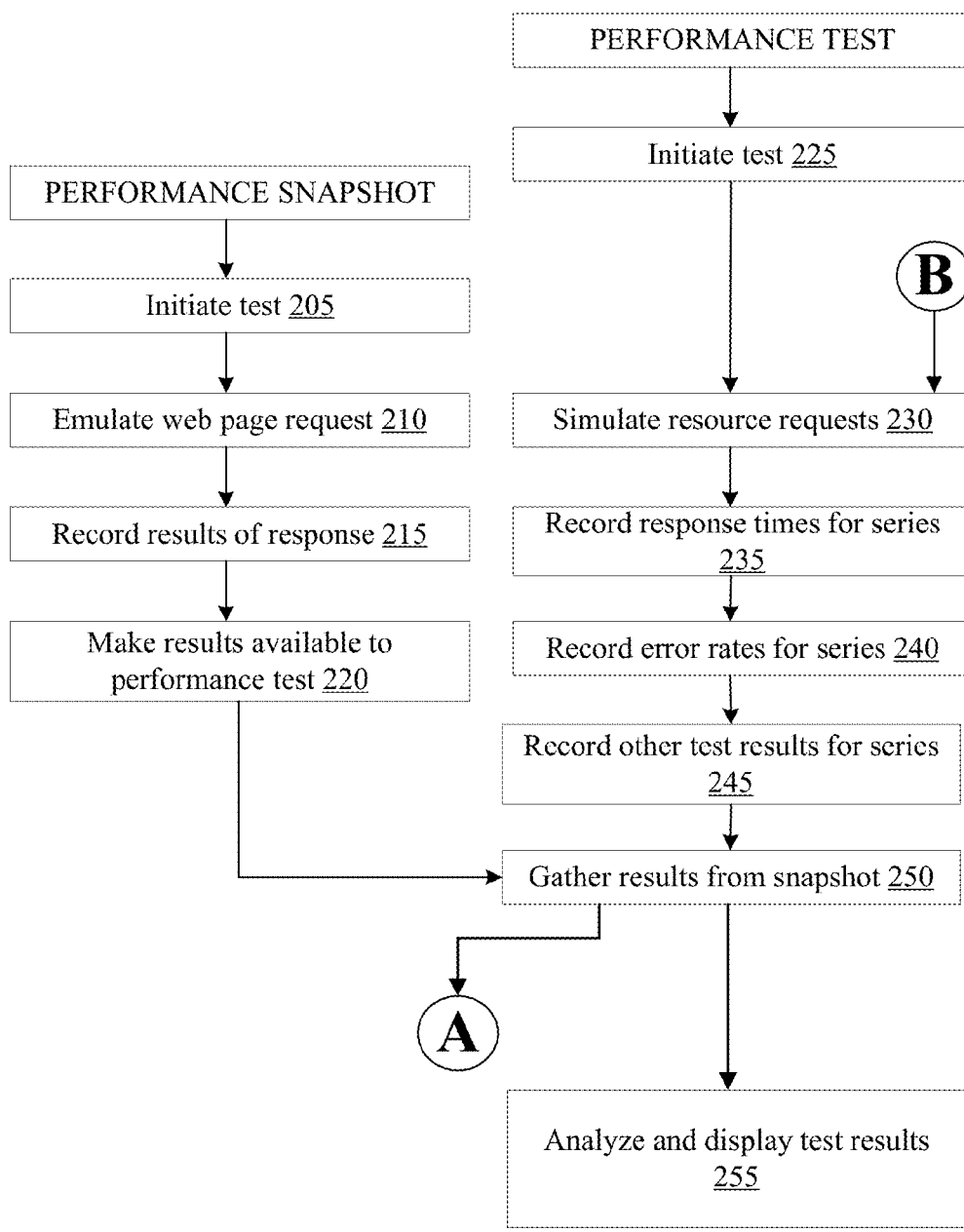
FIG. 2 Performance Snapshot and Performance Test

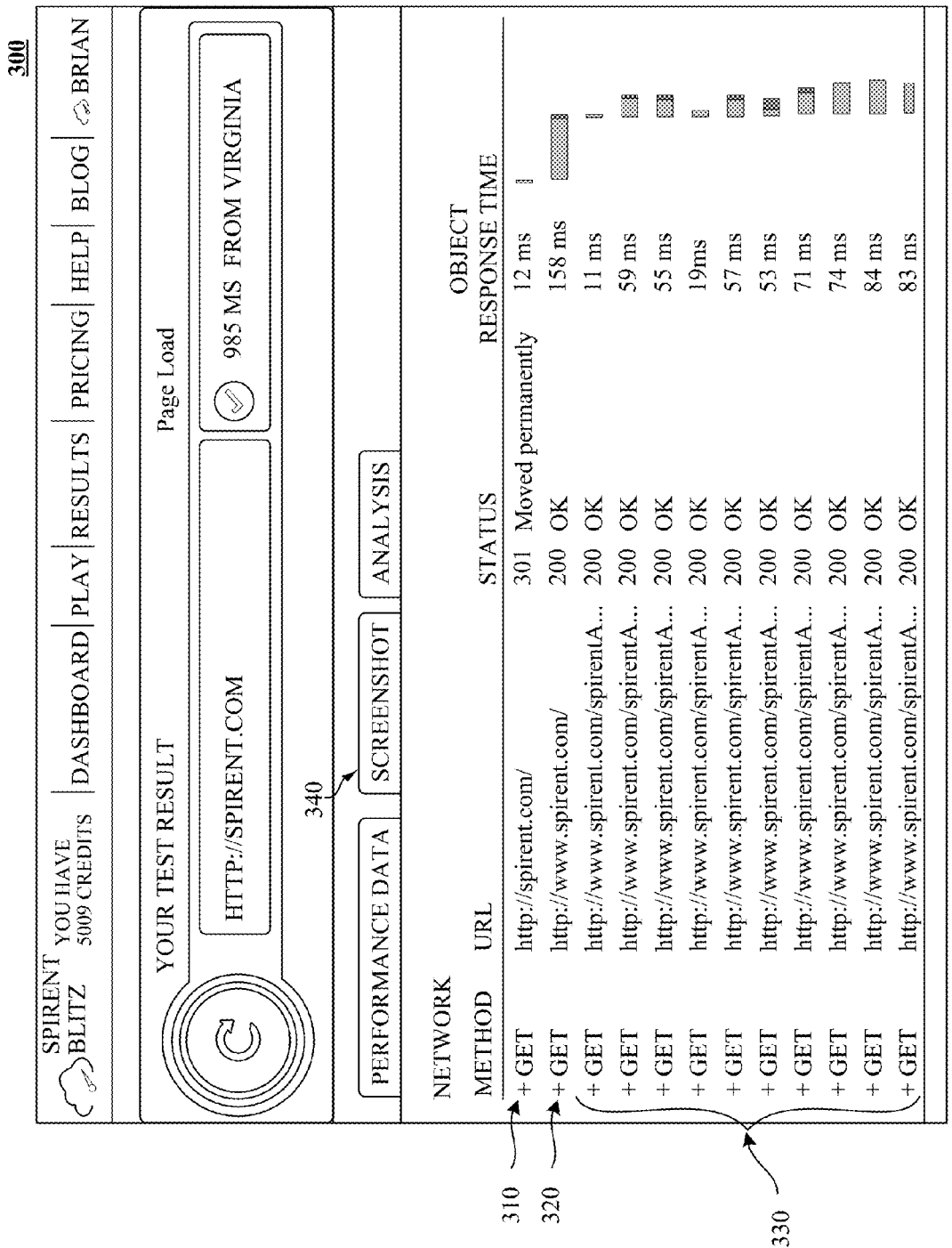
FIG. 3 Cascaded Bar Chart

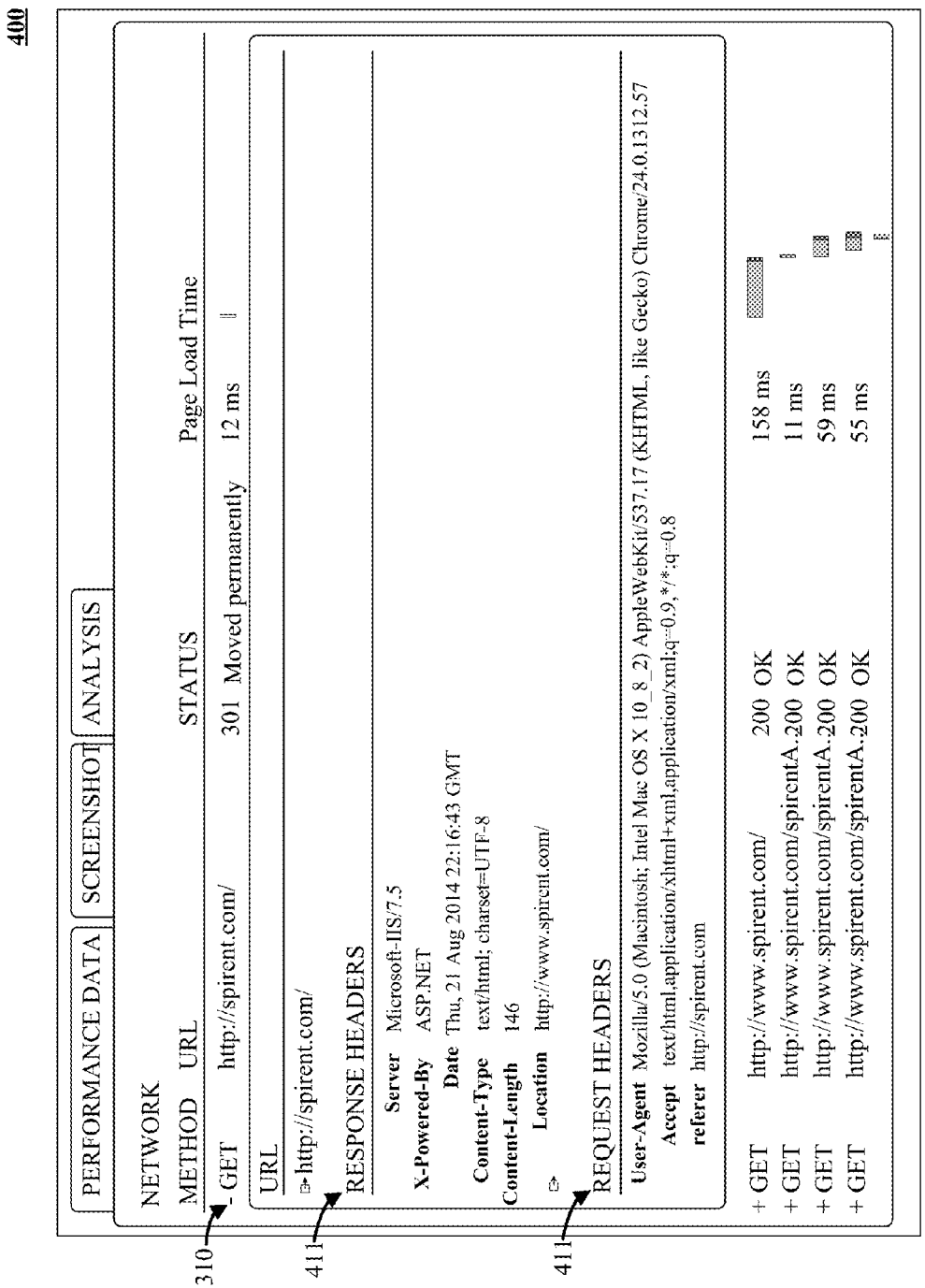
FIG. 4 Request and Response Headers

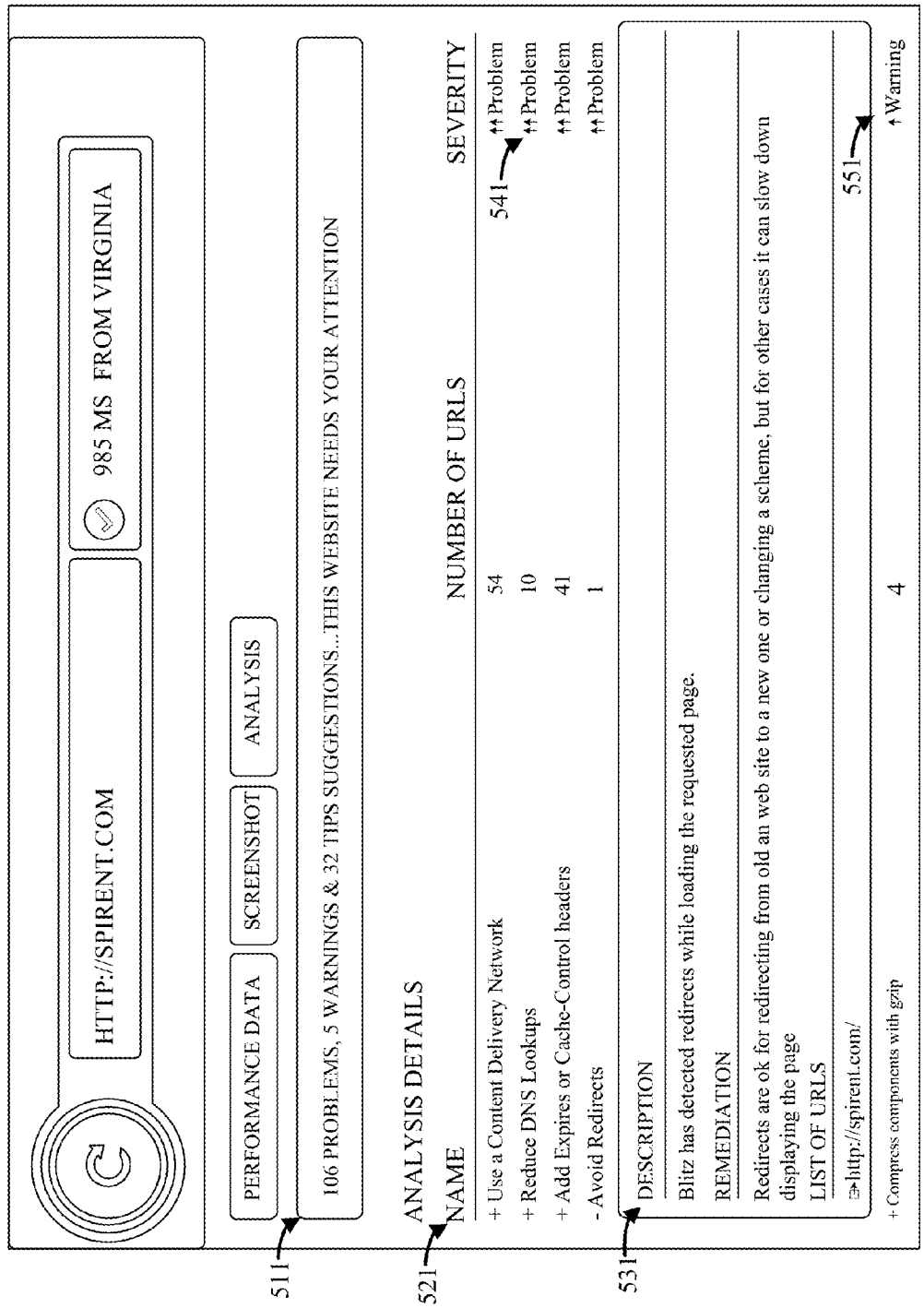
FIG. 5 User Emulation Results

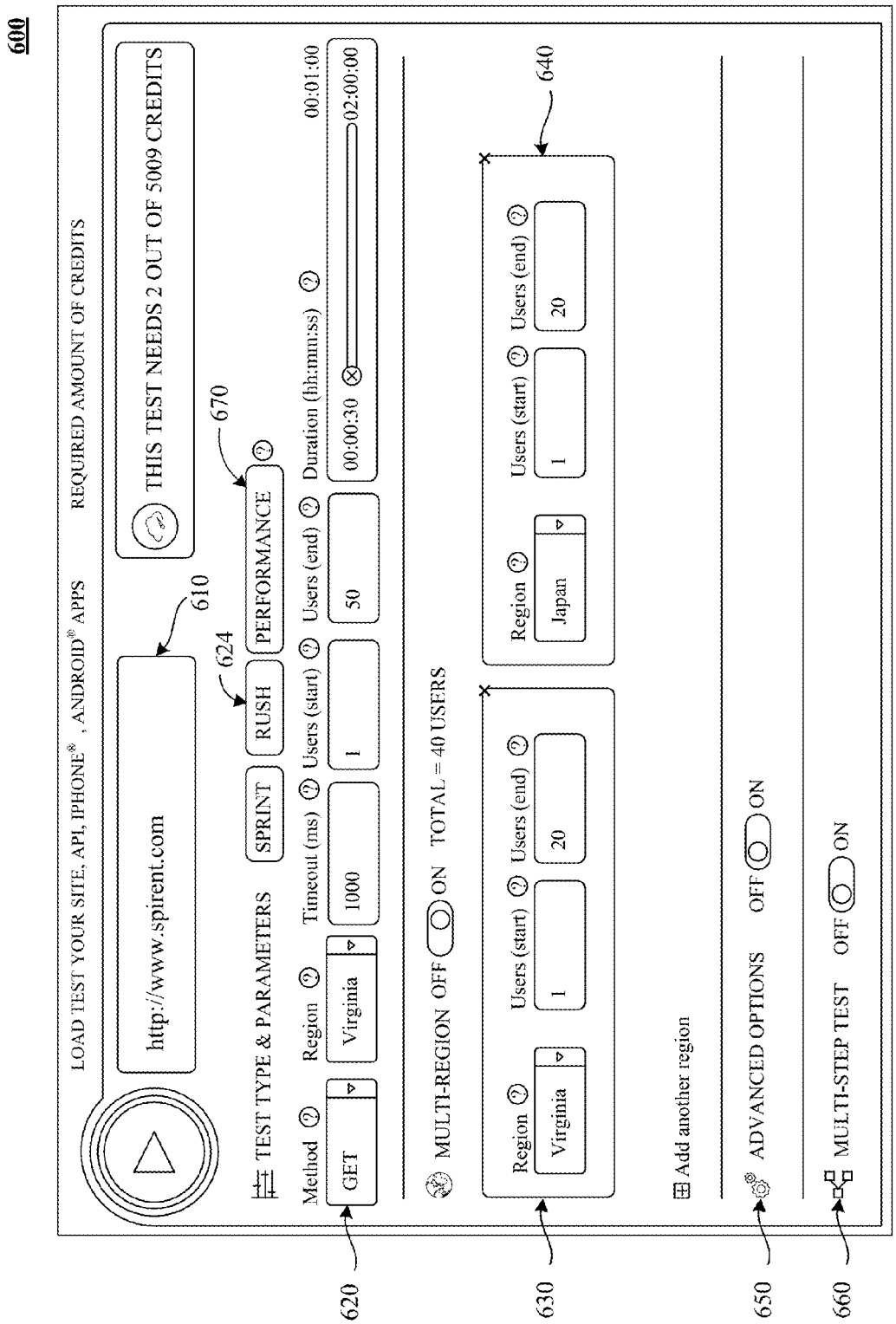
FIG. 6 Test Configuration Interface

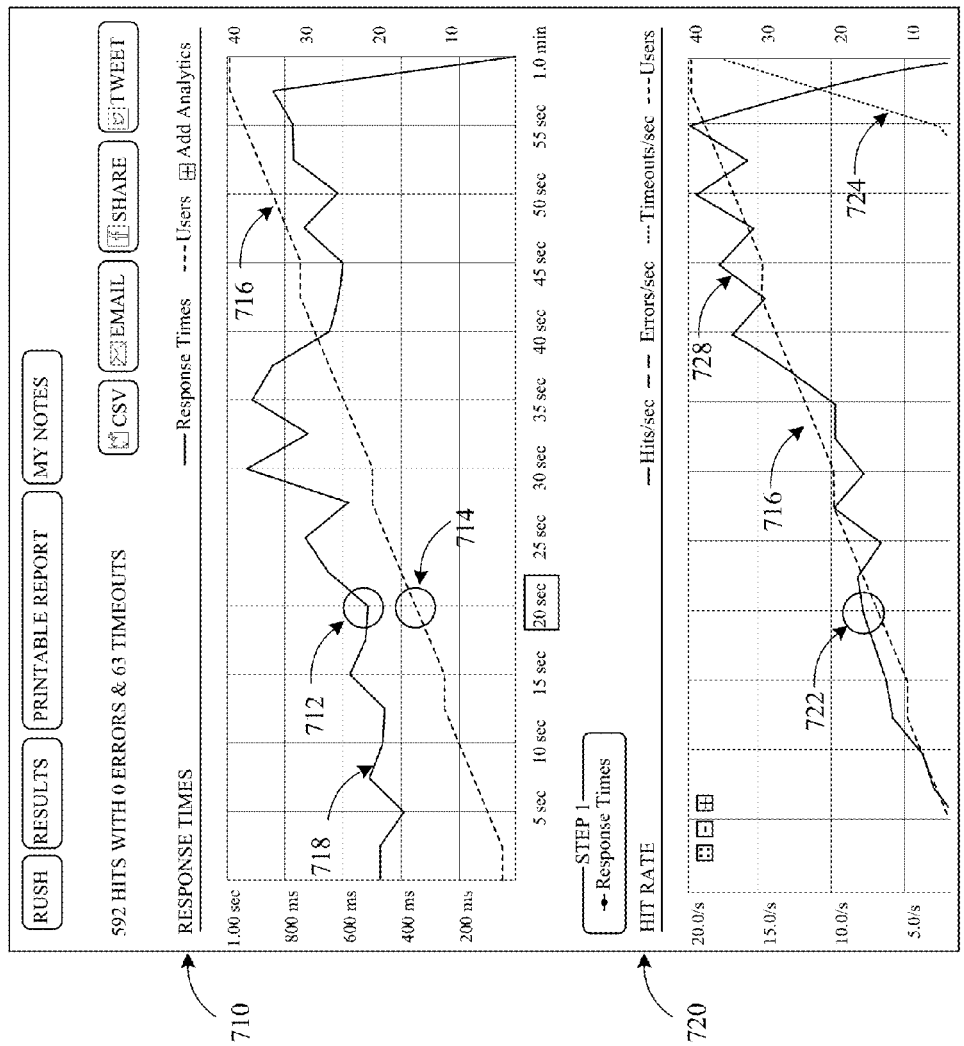
FIG. 7 Response Times and Hit Rates

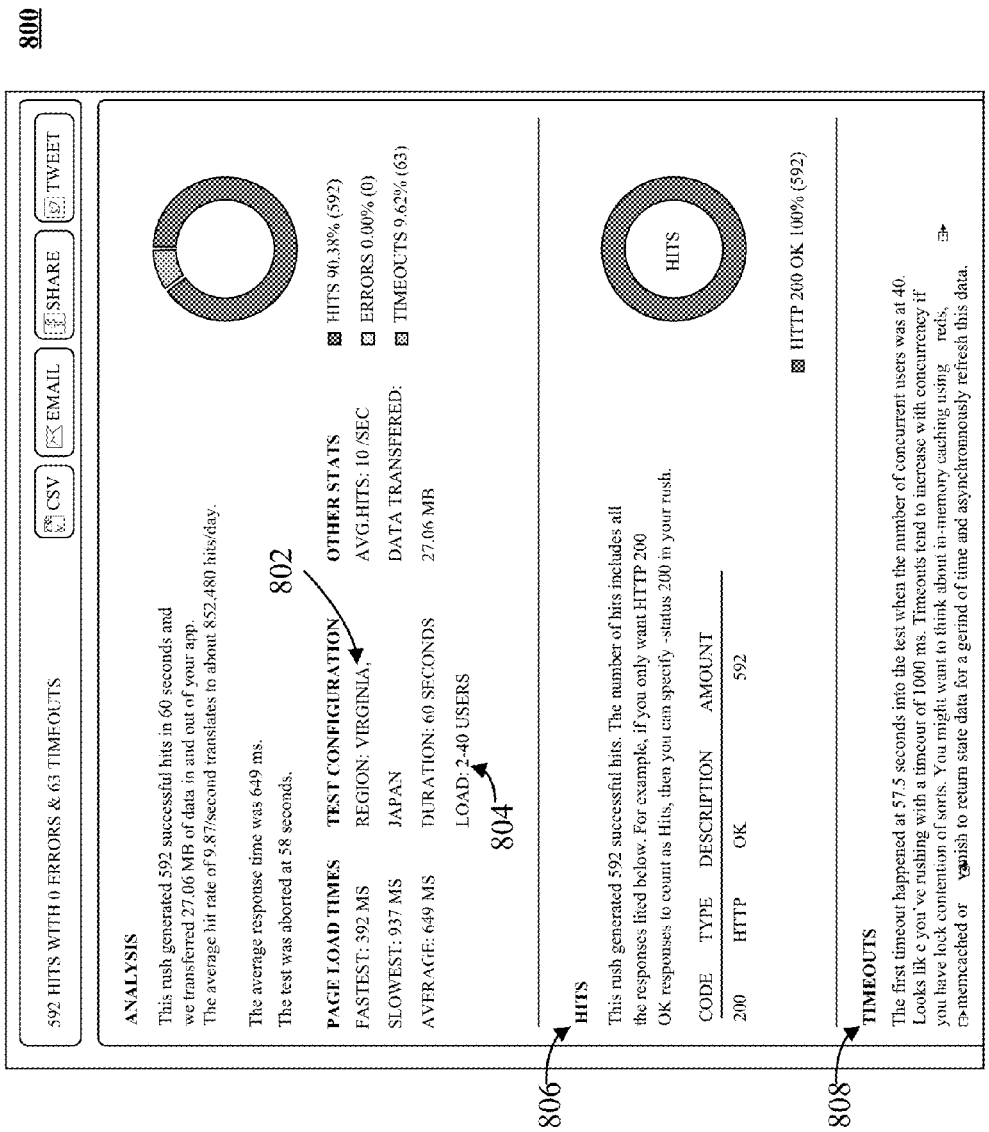
FIG. 8 Summary Statistics

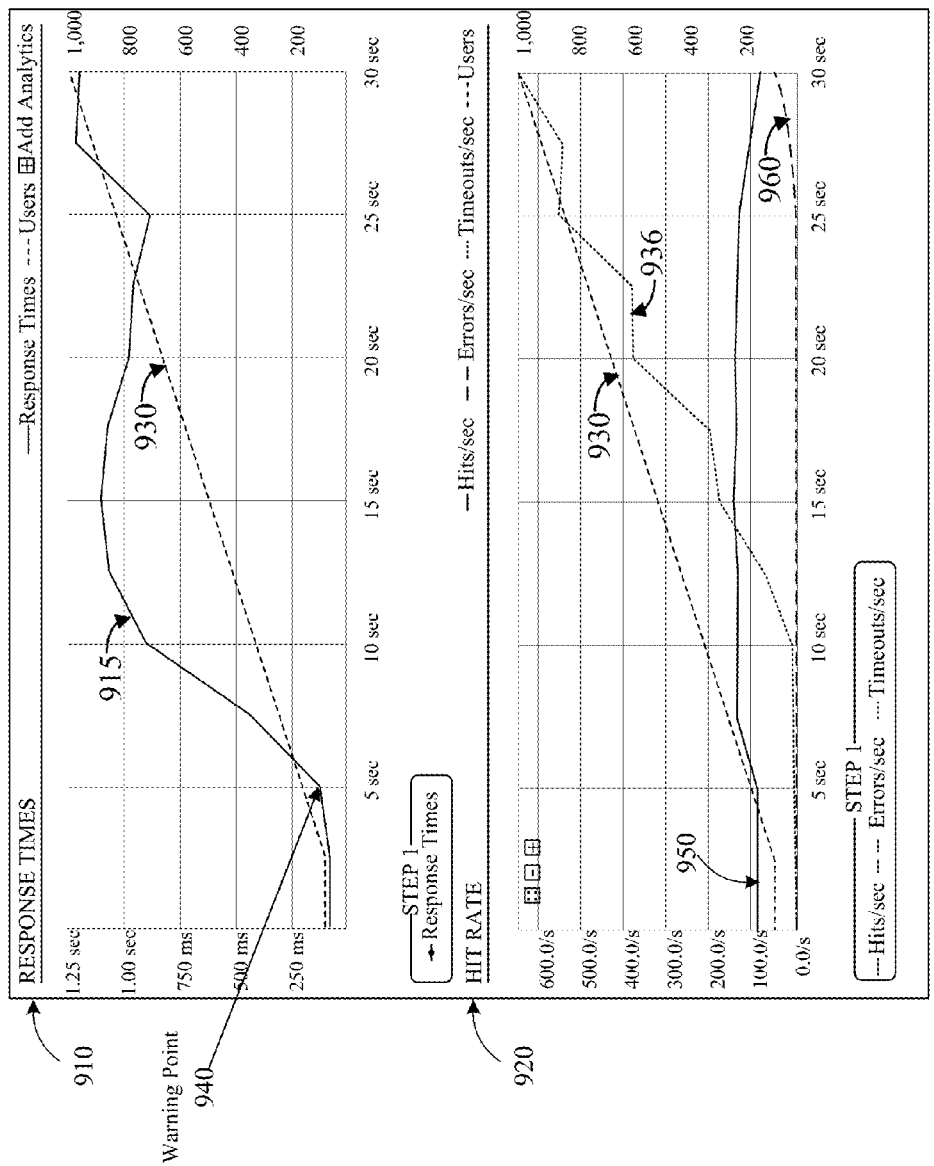
FIG. 9 Response Times and Hit Rates

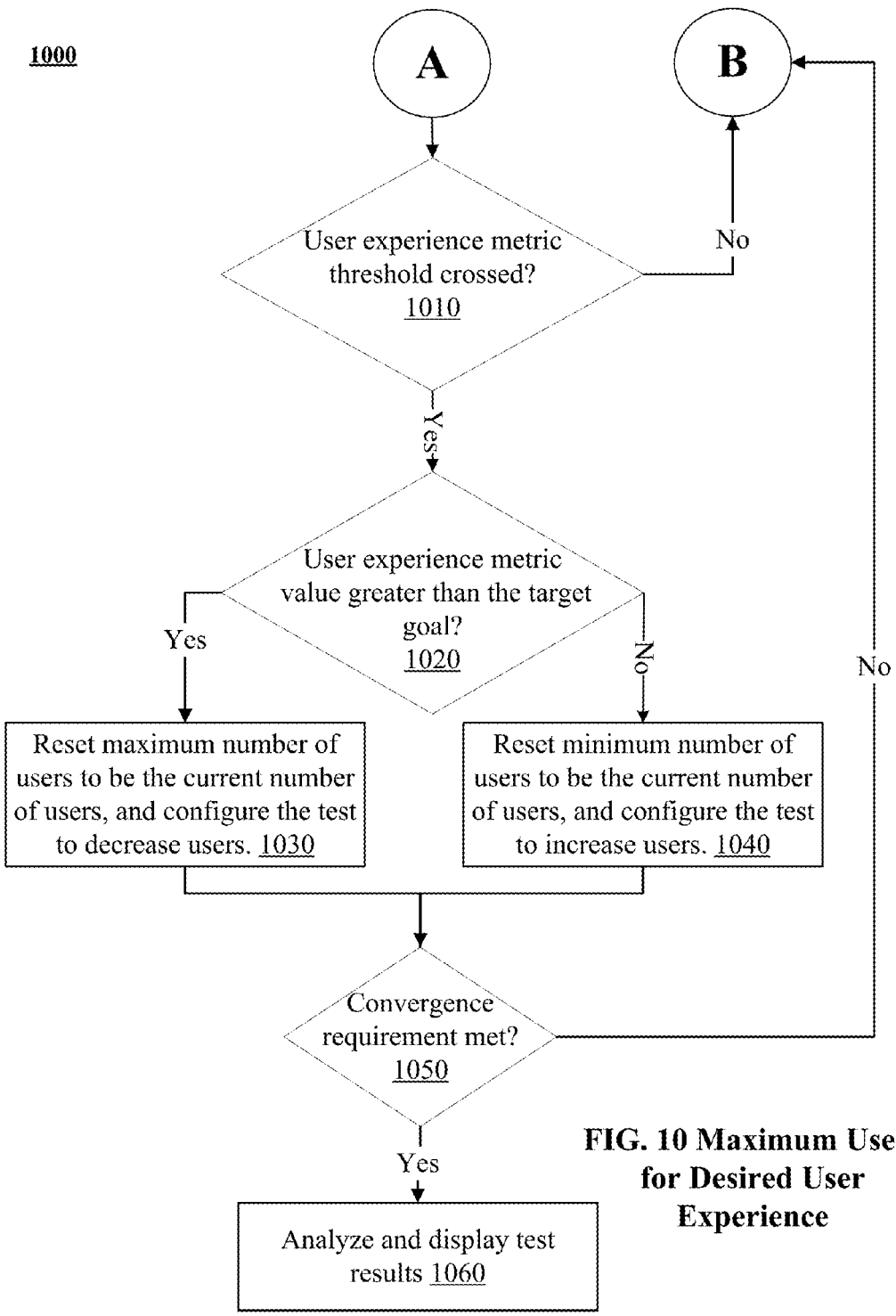
FIG. 10 Maximum Users for Desired User Experience

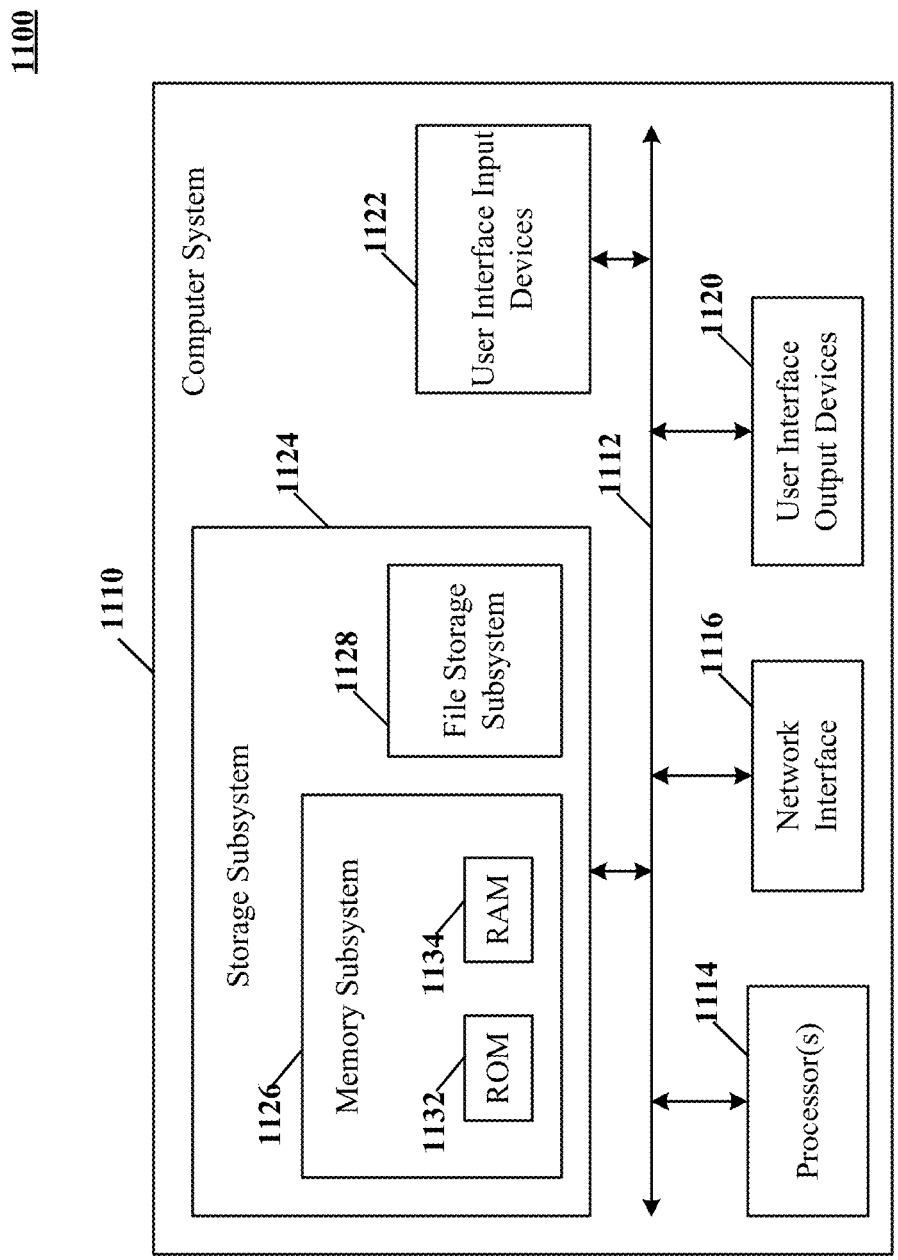
FIG. 11 Computer System

CONDUCTING PERFORMANCE SNAPSHOTS DURING TEST AND USING FEEDBACK TO CONTROL TEST BASED ON CUSTOMER EXPERIENCE PARAMETERS

CROSS-REFERENCE TO RELATED APPLICATIONS

This application is related to the following non-provisional applications which are hereby incorporated by reference:

U.S. application Ser. No. 14/586,180, filed 30 Dec. 2014, entitled "STRESS TESTING AND MONITORING," by Brian Buege; and U.S. application Ser. No. 15/236,262, filed 12 Aug. 2016, entitled "METHOD TO CONFIGURE MONITORING THRESHOLDS USING OUTPUT OF PERFORMANCE TESTS," by Brian Buege.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

A web page can be made of hundreds of objects such as images, Cascading Style Sheets (CSS), JavaScript (JS) modules, Flash, Uniform Resource Locators (URLs) for remote content, and the HTML code itself. The quantity, structure, and configuration of these objects can directly affect the performance of a web page. As well, there are architectural issues such as compression, cache configurations, and Content Delivery Networks (CDNs) that also affect the complexity and performance of a web page.

There are a large number of servers, networking devices, network services such as DNS, and protocols between the consumer of the web page and the source of the web page and its constituent objects. These devices can be connected using media such as copper wire, fiber optics, and wireless technologies that span a large portion of the electromagnetic spectrum. Wireless technologies such as radio, microwave, infrared, Bluetooth, WiFi, WiMAX, and satellites all use the radio spectrum for digital communications. Each device, protocol, and transmission medium has its own operating characteristics, which are further complicated by distances measured in terms of latency. The characteristics of each of the many components of the system between and including the user web browser and the web page content servers may affect the overall user experience of access the web page. Thus, analyzing this user experience and improving it may be very complex.

An opportunity arises to introduce improved test procedures and technologies. More easily configured and operated tests with more accurate performance estimates can result.

SUMMARY

The technology disclosed enables understanding a user experience of accessing a web page or service under high loads with a diverse regional traffic mix. A hybrid test system initiates a test including one or more load generators and at least one emulated web browser. The load generators may send a multitude of web page requests to a system under test from one or more user-selected regions. The load generators may simulate requesting at least parts of the web page from at least hundreds of client requesters (i.e., simulated users). Response times and error rates resulting from the simulated requests may be captured and reported.

An emulated web browser may request the entire web page that is comprised of multiple separately loadable components. Response time, load time and returned error messages for each of the separately loadable components may be recorded, and at least some of the test result statistics displayed to a user. Page load time is the elapsed time between sending the request and receiving/processing the last byte of the response. Page load time comprises response time, which is the elapsed time between sending a request and receiving the first byte of the response, and the load time which is the elapsed time to receive the entire response, process it, and receive the last byte associated with the originally requested page. For example, if a requested web page contains a reference to another web object, the load time for the requested web page includes the time to request, receive, and process the object referenced in the requested web page.

A simulated performance test requests a URL (or a sequence of URLs) without processing the response. That is, if the object returned in response to requesting the URL includes a reference to another web object, the simulated performance test does not request, receive, or load the referenced web object. The response time for a simulated performance test is the time to request and receive the entire response without further processing. For example, if the requested web page comprises HTML, the response time is the time between requesting the web page and the time the last byte of HTML of the web page is received. If the requested URL references a JAVASCRIPT™, object, the response time is the time to receive the last byte of JAVASCRIPT™, without executing the script.

Running the emulation and simulation tests concurrently and measuring the performance allows for understanding the relationship between accessing certain types of objects from different locations and the ability to provide a particular user experience for a number of users. A certain number of users may be simulated and the performance graphed to show the effect of simultaneous users on an individual user experience.

In an implementation, instead of specifying a maximum number of users, the testing system may receive as input a user experience target goal, for example, a maximum number of seconds of response time, page load time, load time for images, load time for JAVASCRIPT™, etc. The test system increases the number of users until the value of the customer experience metric for an emulated user crosses a threshold based on the configured target goal. In this example, the threshold is exceeded when the observed response time is longer than the maximum desired response time. When the threshold is exceeded, the test may decrease the number of users until the observed customer experience dips below the target goal threshold. In this way, the maximum number of users that can be supported while achieving the user experience target goal may be determined automatically.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 1A is a diagram illustrating a test network.

FIG. 1B is a diagram illustrating network connectivity among the local sites of FIG. 1A.

FIG. 2 is a flow chart illustrating a process for performing a performance snapshot and performance test.

FIG. 3 is a screen shot illustrating a performance snapshot waterfall, or cascaded bar chart, with milestone indicators.

FIG. 4 is a screen shot illustrating request and response headers for a particular GET request.

FIG. 5 is a screen shot illustrating a summary of user emulation results.

FIG. 6 is a screen shot of a user interface for configuring a performance test.

FIG. 7 illustrates graphed output of performance test response times and hit rates.

FIG. 8 is a screen shot illustrating summary statistics for the performance tests.

FIG. 9 illustrates graphed output of example performance test response times and hit rates for a second rush test.

FIG. 10 is a flow chart illustrating a process for identifying a maximum number of users that can be supported while maintaining a desired user experience metric.

FIG. 11 is a block diagram of a computer system on which the technology disclosed may be implemented.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Introduction

The user experience of retrieving a web page over a network can be impacted by characteristics of the many components that are involved in requesting, servicing, and responding to the requests. Such characteristics can include multiple networks each with bandwidth and latency characteristics in response to varying traffic loads, server response times affected by factors including hardware performance capacity, caching strategy, and competing requests. In addition, a separately loadable component (also referred to herein as an "object" or "requested object") within a web page may be provided by a content delivery network (CDN) that is separate from the web server. The CDN may have its own performance characteristics. With so many factors impacting the overall user experience, it may be very difficult to predict for a particular end-to-end configuration what the user is likely to experience when requesting a web page.

The disclosed technology provides a testing environment in which the performance of loading a web page within the system may be studied under varying user loads. Doing so may enable an informed choice of offerings including server and content provisioning, quality of service guarantees, and alarm thresholds.

Content delivery and customer self-service span borders. Success or failure is measured at the application layer as user experience, wherever the user is in the world. Data related to major brands is delivered across continents around the clock in at least 20 time zones. Distributed data centers are intended to reduce latency, but the supporting infrastructure varies wildly around the globe. Slow communications are endemic to regions that rely on satellite links, both because of capacity and cost constraints and because of the distance that a signal travels to bounce off a satellite. Sluggish page loads associated with slow ping times and high latencies can be inordinately stressful to servers, keeping a server engaged with a single page load many times as long as it would be engaged on a low latency channel. A small number of distant users can tax a system more than a much larger number of users close to a CDN provider.

Content for a single web page is delivered from multiple sources, sometimes dozens of root domains. Elements of the web page may, for instance, come from data center processing, memcaches, content delivery networks (CDNs) and ad networks. For instance, authentication and personalization may be handled by a data center, cascading style sheets (CSS code) fetched from a memcache, and product illustrations or videos supplied by the CDN. The combination of request and response sources of data makes for complex testing scenarios.

The technology disclosed mixes traffic simulation to generate bulk loads with page load emulation to produce a realistic evaluation of user experience at a browser or application. Traffic simulation can be performed by a state machine or a script without rendering or web page load order dependencies. A critical web page resource can be stressed and over-provisioned resources ignored, as load simulation does not depend on how a browser loads a web page. Browser or app emulation, in contrast, follows page load dependencies and evaluates user experience. More resources are needed to emulate page loads than to simulate traffic. A test simulates most of the load and emulates a few, preferably a statistically significant number of page loads. As the volume of simulated traffic ramps up, the number of emulated page loads can remain relatively level, consistent with a sampling plan.

The mix of traffic simulation and page load emulation can be used to set notification or alarm thresholds for system monitoring. Visualizations of emulated page load results allow a system administrator to pinpoint conditions that precipitate deterioration of user experience. The test system can explore resource load patterns that degrade user experience and present visualizations. Simulated load components can be increased by a simulated load generator to degrade load time beyond a limit and then rerun with finer granularity close to the limit to present a clear picture of how load impacts performance. A so-called elbow or knee in a response graph can readily be seen by the system administrator of the system under test. Control backing of the visualization allows the administrator to select a performance discontinuity or from the vicinity of a performance break to set notification thresholds. The system can find a variety of correlated factors and recommend or set additional thresholds, supplementing the independent variable in the visualization used for the administrator's selection. In some implementations, the user can specify a maximum web page load time and the system can respond by setting or recommending thresholds for different system loads, selecting visualizations for administrator evaluation or both.

Basic Testing Environment

FIG. 1 is a diagram illustrating a test network. The test network hosts a hybrid test system that runs two different kinds of performance tests concurrently; load simulation and user emulation. The word "simulation" is used to connote reproducing an aspect of behavior for specific study that is only a portion of what would be done by actual users. For example, load simulation only requests one URL and does not process the contents of the response. (A multistep performance test may sequentially request two or more URLs. Instead of parsing the first URL to determine whether further embedded URLs should be retrieved, any embedded separately loadable object components are identified before the test begins and their retrieval is scripted). Thus, if these object requests are referenced within a response, they are not retrieved and loaded as they would be in actual use.

The word "emulation" is used to connote running a test that mirrors loading content into a browser or app in the actual use. For example, user emulation uses a custom web browser that automatically requests and loads an entire web page with behavior approximating a user's browser. In an automated test, as opposed to actual use, the emulated browser is unlikely to cause web pages to be displayed on a monitor. Different emulations can approximate the behavior and performance of various browsers. The performance observed during user emulations measures a user experience in the presence of a produced by simulated resource requests.

FIG. 1A is an overview diagram that illustrate network connectivity in an environment that uses load simulation and user emulation technologies. In an implementation, computing and network devices within a site may be connected via a local area network (LAN). Sites are connected by a WAN 190 that may include, for instance, a wired network 185 and satellite link 195. For at least the last mile delivery, a variety of other physical layer media may form parts of the WAN, such as cable, WiMax, and cellular transmissions. For example, a wired network 185 may connect local sites 160 and 140, test configuration environment 120, and test initiator client device 150. The Indonesia testing site 130 may connect through a satellite network 195 using ground stations to connect into the WAN 190, introducing higher latency. Traffic generated at the testing site in Virginia will travel less distance with lower latency to the server under test than traffic generated in Indonesia and carried by a satellite network link 195.

The example network illustrated in FIG. 1B shows additional detail of a Host Environment site 110 in which a Web Server Under Test 106 resides. The user experience of requesting and loading a web page served by the web server under test 106 is measured in the presence of a simulated load. The simulated object request load may exercise a diverse set of resources based on the type of object being retrieved. For example, if an object is computed based on data stored in a backend database, the time required to retrieve the object will be affected by delay introduced by the database server, and retrieving objects stored locally on the web server would not experience as much delay. In addition, different performance may be observed due to the diverse locations of the simulated users may introduce different latencies. In an implementation, the host environment 110 may comprise a local area network in which resides a data center 102. Network connectivity with other sites is maintained between router 108a and network Connectivity 190.

The host environment 110 is illustrated to show potential complexity of the environment in which a web server under test 106 may reside. As illustrated, the network between a firewall 112a and 112b comprises a Demilitarized Zone (DMZ). In an implementation, the web server under test resides within the DMZ. A router 108b may connect the DMZ to a data center 102 where content servers and web servers may be hosted. In an implementation, the web server under test 106 may host a web page having references to web objects that are retrieved from inside the data center 102. Requests for the web page hosted by the web server under test may arrive through network connectivity 190 from remote sites, and requests for web objects hosted in the data center 102 may similarly arrive from remote sites through network connectivity 190 to create a traffic load for the test. However, in other implementations of a host environment 110, routers and/or firewalls may be implemented in software and not require a physical device. In addition, the web server under test 106 may reside in a host environment 110 that does not include a full datacenter or an intranet.

Another site illustrated in FIGS. 1A-1B is the Test Configuration Environment 120. The figure illustrates at least one server or test appliance that generates and/or serves a test configuration interface that allows a user to create a test plan, and a server in the test configuration environment 120 sends instructions to other sites to initiate the test plan. In an implementation, a user using a Test Initiator Client Device 150 accesses the test configuration interface through network connectivity 190, configures a test, and generates a test plan. In an implementation, test initiator client device 150 may include a web browser, and the test configuration interface may be a web-based interface.

A Test Controller 128 in the test configuration environment may distribute the test plans to each site for which users will be simulated and/or emulated. A test controller is a computer that contains a library of tests. The test controller 128 also receives performance data back from these sites and stores the performance data in the Performance Data Repository 126. User output, including reports and graphs, are produced using the test results data stored in the performance data repository 126.

One or more testing sites 110, 120, 130, 140, 160 may be installed at different geographic locations for receiving a test plan and executing the test plan by simulating a specified number of users requesting a certain URL from that site location. For example, testing site 140 may reside in Virginia, and the local servers 142 may receive the test plan and simulated the requested number of users requesting a specified URL from Virginia to the host environment 110. Another testing site 130 may be located in Indonesia and simulated users accessing the URL from Indonesia. A number of pre-established sites such as Virginia 140 and Indonesia 130 may include one or more local servers 142 and 132 respectively with software installed for receiving and executing a test plan sent from the test controller 128 in the test configuration environment 120. Test servers distributed to sites such as Virginia 140 and Indonesia 130 provide a diverse regional traffic mix. The sites chosen for the test are referred to as user selected regions. Test configuration environment 120 may also serve as a testing site, though that is not required.

In an implementation of the invention, the software installed on the one or more local servers 132, 142 in a testing site runs in a virtual machine that may be easily installed on a server at a site other than one of the pre-established sites. For example, Other Site 160 illustrates a network site that has not been pre-established for testing purposes, but a computer device 162 on the Other Site 160 is able to download and run the virtual machine needed to execute the test plan. Thus, a site not previously configured as testing site may be selected and configured on the fly as a testing site. This has been extended to include resources in Amazon Web Services (AWS) and other cloud-based platforms.

Note that the user configuring the test (i.e., the Tester) may reside anywhere that provides network connectivity between the test initiator client device 150 and the test configuration environment 120. Thus, the test may be located within the Host Environment 110, within the test configuration environment 120, or within any pre-established simulated users site or other local site configured on the fly as a simulated users site.

User emulation may be accomplished by a custom web browser retrieving a web page and collecting performance data for receiving a response and loading various objects on the page. The web browser emulators may be located in any of the environments shown in the test network. Web browser emulators used for user emulation 144 and 164 are illustrated as running in the Virginia testing site 140 and the other site 160, respectively. Thus, a browser emulator may be co-located within a testing site in which user simulation is performed. A web browser emulator differs from a standard web browser in that the resulting page is not necessarily drawn on a screen. The web browser emulator initiates communication with a web page through a published API, such as XMLHttpRequest from the Mozilla Developer Network. This is very useful when doing volume unit testing on specific assets within a web page.

FIG. 2 is a flow chart illustrating a process for performing a performance snapshot and performance test. Prior to starting the flows illustrated in FIG. 2, the tester configures the tests and the test plans have been delivered to the required sites. Flow chart 200 illustrates a performance snapshot process (user emulation) and a performance test process (user simulation) that begin independently of one another. The performance test process begins in Step 225 during which the test starts to execute. Executing the test comprises executing the test plan received from the test configuration environment. In Step 230, resource requests generated for a configured number of simulated users in the selected regions place a traffic load on the web server serving the requested web page. The load also affects all intervening networks and backend services accessed by the web server to provide the requested page. In an implementation, each simulated web request can access a single retrievable object. For example, a single object may be a .css, .htc., .js, .gif, .jpg, .png, .avi, .mpeg, or quicktime file, or a single object may be represented by a URL, which when requested, causes execution of a server-side application or script to generate content in real time rather than retrieving pre-stored content. In Steps 235 and 240 respectively record the response times and error rates for the performance tests. In Step 245, other test results are recorded, for example hit rates and timeouts. Performance testing can be targeted at only one asset at a time. As well, performance testing can target a plurality of resources.

The Performance Snapshot process may be initiated in Step 205, and can be timed to execute at pre-configured intervals. The web server is then subjected to the load created by the performance test while an emulated browser requests the entire web page in Step 210 at the pre-configured intervals. The results of the response to retrieve the entire web page are recorded in Step 215, and this recorded performance data is provided to Step 250 that gathers the results from the Performance Snapshot test. In Step 255, the gathered performance data is analyzed, and the results are displayed for the tester. In an implementation, performance data may be stored in the Performance Data Repository 126 and retrieved by the test controller 128 for analyzing and presenting test results.

Reference letters A and B are included for describing an alternate implementation that extends the flow illustrated in FIG. 2 as described in FIG. 10.

Emulation Test Configuration

In an implementation, multiple user emulation browsers may be configured to run concurrently. In addition, each user emulation browser may be configured to run at a site in a particular location. Though the user interface is not shown in the screen shot, the Performance Tab 670 illustrated in FIG. 6 allows configuration of the user emulation such as the URL of the web page to retrieve, the number and location of emulators, and the time interval for running the test (i.e., when/how often to start retrieving the web page. The type of output to produce from the test such as a Program Evaluation Review Technique (PERT) chart or Waterfall diagram and the number of time per second to start the user emulation test may also be configured.

Emulation Test Results

FIG. 3 is a screen shot illustrating a performance snapshot waterfall, or cascaded bar chart, with milestone indicators. In this example, the screen shot was generated by emulating at least one browser running on hardware located in Virginia and sending GET requests for a Spirent home page and its component objects. The total page load time for loading the entire web page was 985 ms. The Performance Data tab of the test results is displayed. GET requests issued by the browser to retrieve objects on the web page are individually listed along with the response status and the object response time. For example, the initial request for //spirent.com (310) took 12 ms to receive a response. The response was a 301 status and redirection, indicating that the page was moved permanently to www.spirent.com. Requesting the redirected page, //www.spirent.com (320), took 158 ms to complete and was successful (Status 200). The object response time 320 include both initial response time and object load time (mostly initial response time.) The main web page returned with embedded references 330 to other objects. The emulator issued GET requests (330) to retrieve the objects referenced on //www.spirent.com. The page shows status and object response time of the GET requests. The object response time bar indicates the object response time, displayed in two parts as appropriate. The left part of the bar indicates the time to receive the beginning of the response (i.e., the response time.) The second part of the bar indicates the object load time, from the beginning of the response to completion of loading the object. Many objects are loaded concurrently. The overall length of the bars represents the total page load time. In an implementation, the first and second parts of the bar may be displayed in contrasting colors or patterns.

On the test result web page, the screenshot tab 340, which is not displayed in the figure, depicts the state of the web page under test at chosen stages of load. For example, GETs 2 through 6 of 330 are CSS files. These 5 GETs can be selected as a group, and the screenshot tab 340 would show the state of the web page at the point where these 5 GETs had been loaded, but subsequent objects had not.

FIG. 4 illustrates a drill down on the first GET 310 in FIG. 3. Selecting the plus sign next to GET 310 resulted in display of response and request headers 411 for a particular GET request. The example shows the target location of the redirection in the location field of the response header. In one implementation, a user selection of a bar can open a new report showing the approximate visual appearance of the web page components at that point in time, wherein only those assets that had been retrieved since the start of loading the web page until the time indicated at the user selected bar would be displayed.

FIG. 5 illustrates the analysis tab of the emulation test results. From this tab, a user can access an analysis of the web page loaded. The example analysis indicates that the website being tested could benefit from attention 511. It identifies 106 problems, 5 warnings and 32 suggestions for improvement that were found when analyzing the captured data. The first four lines under Analysis Details 521 shows four categories covering the 106 problems found. The problem category "Avoid Redirects" is expanded 531 to provide a description of the problem, suggested remediation and a list of URL's to which the suggestion applies. Other problem examples in the figure include: use a content delivery network; reduce the DNS lookups; and add expires or other cache-control headers. The last line seen at the bottom of FIG. 5 is a Warning 551, which follows the issues assigned a severity level of Problem 541.

Rush Test Configuration

FIG. 6 is an example interface for configuring a performance test (also referred to a "rush" and displayed under the RUSH tab 624.) Test configuration interface 600 allows a user to configure the performance tests to place a load on the web server under test 106 while running the emulated browser. The URL to retrieve appears in text field 610 and is editable. Test types and parameters 620 allows configuration of the method to test (e.g., GET, POST, OPTIONS, HEAD, PUT, DELETE, TRACE, CONNECT, PATCH), what location to run the test from (e.g. Virginia), how long to wait for a response before timing out (e.g. 1000 ms), and how long to continue running the test. For example, the test being configured in this example will comprise serial GET requests from 40 client-requestors, lasting one minute. At the beginning of the test, only one client-requestor in each region 630, 640 is simulated (two total), and at the end of the testing time, twenty client-requestors are simulated in each region (forty total).

Multi-region configuration allows specifying regions and the number of client-requestors to simulate per region, both at the start of the test and at the end. During the test, the number of client-requestors increases. For example, the region Virginia 630 starts with one client-requestor and ending with 20 client-requestors requesting the page. The test for each simulated user comprises serial requests for at least some components of URL 610, as described above. This test lasts only one minute. Similarly, the region Japan 640 begins the test with one and ends 20 simultaneous simulated client-requestors issuing GET commands for at least one component of the URL 610 from hardware located in Japan. More regions may be added to the test.

The Advanced Options 650 portion of the user interface allows configuring parameters for the HTTP request that is sent when running the test. For example, the advanced options feature allows setting the user-agent, cookie, and data to include in a PUT or POST request. Authentication information and SSL version to use are other examples HTTP parameters that may be specified through advanced options. In addition, the one or more HTTP status codes that are to be considered as successful results (i.e. counted as a "hit") and the amount of time to wait for a response and load completion before timing out are examples of test environment parameters that may be set with advanced options. The multi-step test 660 allows configuring a simulated load that includes a sequence of http operations, also known as a sequence of requests. For example, if the user experience metric of interest is the time to load images, a multistep test might be configured to retrieve a sequence of URL's to objects referenced within the web page with an image content type (files such as .jpg, .png, .gif, etc.).

Rush Test Results

FIG. 7 illustrates graphed output of performance test response times and hit rates. For both the top graph 710 and the bottom graph 720, the X axis of the graph represents time elapsed from the start of the test. The dashed line 716 on each graph plots the number of simulated users that varies with the elapsed time of the test. The number of users appears on the Y axis on the right side of the graph. The graph indicates that the test started with two users and at the configured end of the test (for example, after one minute), there were forty simulated users.

Referring to the top graph 710 labelled "Response Times," line 718 graphs the average total page load time over all users at each time point in the test. The numbers on the Y axis on the left side of the graph indicate average total page load. For example, at 20 seconds into the test, the total page load time (712) across 17 simulated users (714) averaged about 500 ms.

Referring to the bottom graph 720 labelled "Hit Rate," the numbers on the Y axis on the left side of the graph indicate average hit rates (hits per second). The line 728 in bottom graph 720 plots the average hit per second across all simulated users. A test run records a "hit" when a specific HTTP status code is returned, for example, a successful status code 200. Some test runs will return error codes or timeouts. In one implementation, tests receiving a returned error or timeout result would not be counted as a hit. For example, at 20 seconds into the test, the responses time across 17 simulated users averaged about 7 hits per second (see reference point 722). At 55 seconds into the test, most of the responses were timeouts (indicated by line 724) and the hit rate plunged dramatically. This suggests that 36 to 40 users simultaneous was enough to break the site, which peaked at responding to 17-20 requests per second, or at least to push the response time beyond the timeout threshold of 1000 ms.

The test that generated the data for these graphs represent simulated users across all (for example, both) configured regions while performing one configured HTTP method on one configured URL. For example, at the end of the test, twenty of the users were simulated from Japan and twenty were simulated from Virginia, and their results were averaged together. In an implementation, the configured HTTP method is a GET request for one URL. In other words, all users simulated by the test requested the same object. In one implementation, a selected region or regions can be used in filtering the graphs to see the effects that regional impact can have on the test.

FIG. 8 is an example of summary statistics for a rush test. This screen provides a textual presentation of data analysis corresponding to the rush test result statistics shown in FIG. 7. The analysis includes a summary of the rush configuration including numbers of users (load) 804, regions (Virginia, Japan) 802, and hit configuration 806, and presents average response times, hit rates, and error rates across the entire test duration. An analysis of the timeouts is also provided 808.

FIG. 9 illustrates graphed output of example performance test response times and hit rates for a second rush test, according to one implementation of the technology disclosed. The second rush test that generated the data plotted in FIG. 9 was configured to start with 100 simulated users, then to increase the number of users over time until it reaches 1000 simulated users over a test duration of 30 seconds. The number of simultaneous simulated users is the line 930. Average response time is reported as line 915, and average hit rate is identified by the line 950. Line 936 in graph 920 represents average timeouts for the test. Line 960 indicates the average errors experienced during the test. In one implementation, an example of a warning point 940, which is referred to as an elbow or knee, is identified in the plotted response time graph. This knee indicates that at about 5 seconds into the test, the response times increase dramatically with only about 170 users. This warning point can be used to configure a monitoring system that can take specified actions when the indicated threshold is met. Similarly, in graph 920, returned errors 936, creep into the results starting at about 10 seconds with about 400 simultaneous users. The hit rate stops increasing after about 7.5 seconds when there are slightly over 300 users and 150 hits per second. As the number of users increases beyond 300, the hit rate remains level and the timeout rate grows. For one implementation, these performance results can indicate that when the system receives requests from 200 concurrent users, the user experience is in danger of being adversely impacted. By 400 concurrent users, the system begins to time out instead of experiencing an increased hit rate. In one implementation, any set of this information, as well as other information such as errors per second 960 can be used to configuring a monitoring system for operational use.

Automated Feedback Loop Using Customer Experience Target

As explained above, the basic rush test configuration runs user simulations starting with a first number of users and ending with a second, higher number of users, and ramps up from the first number to the second number of simulated users over a specified duration. A tester may draw conclusions about the effect of loading an object of the type retrieved by the rush test on the overall user experience by inspecting the performance results of a rush test together with performance results of an emulated user test that is run during the rush test. For example, retrieving text-based objects may have a different impact on the user experience than retrieving image or media objects.

In an alternate implementation, a user experience target metric may be configured instead of, or in addition to, the maximum number of users. User experience target metrics include overall page load times, page load times for loading certain object types such as images or JAVASCRIPT™, or style sheets. For example, a web page requested by a user emulation may include multiple images. The page load time for images may be determined by summing the page load times for each of the images in the web page. The user experience metric is recorded from the user emulation, and the performance result may be used to reconfigure the rush test while the test is still running. For example, if a one second page load time is desired, the test can provide insight as to the maximum number of concurrent users that may be supported while continuing to provide one second page load time. The number of users may increase until the emulation page load time exceeds the configured amount (e.g. one second). The test may then automatically decrease the number of simulated users until the observed emulation page load time is below one second. The number of users is expected to eventually converge to a number of simultaneous users that may be supported while providing the desired page load time user experience. In an implementation, instead of configuring the time duration of the test, a tester may configure a convergence value that indicates when to stop testing. The convergence value may indicate how close the lower and upper bound numbers of users are to each other. For example, a convergence value may indicate an absolute simple difference between the upper and lower bound number of simultaneous users, or the convergence value may indicate that the difference between upper and lower user numbers is a percentage of one of the upper or lower number.

FIG. 10 is a flow chart illustrating a process for identifying a maximum number of users that can be supported while maintaining a desired user experience metric. The flow chart is an extension to FIG. 2. The flow starts from Reference A in FIG. 2 and proceeds to Step 1010 in which the data gathered for the user emulation is examined and the user experience metric value is compared to the target value. A threshold is crossed when the target user experience metric value is between the previously observed user experience metric value and the currently observed user experience metric value. For example, if the target user experience metric is one second page load time and the previous test observed a half second page load time and the current test observes 1.5 second page load time (or vice versa), the one second page load time metric threshold has been crossed. If the threshold is not crossed, then the test proceeds to Reference B in FIG. 2 and continues running as before.

If the threshold has been crossed, then the process continues at Step 1020 where the direction of threshold crossing is determined. If the threshold was crossed from low to high, then processing proceeds at Step 1030 where the current number of users becomes the new maximum number of users, and the test continues running with decreasing numbers of simultaneous users. If the threshold was crossed from high to low, the process proceeds at Step 1040 where the current number of users becomes the new minimum number of users, and the test continues running with increasing numbers of simultaneous users.

Once the testing parameters are updated in response to a threshold crossing, processing continues at 1050 in which a test determines whether a convergence requirement has been met. In an implementation, convergence is achieved (i.e., the requirement is met) when the difference between the maximum number of users and minimum number of users is sufficiently narrow. If the range of minimum number of users and maximum number of users has narrowed sufficiently, then convergence is reached and the test may stop. The performance data is then analyzed and displayed in Step 1060. If the convergence requirement is not yet met, the test continues running with the updated parameters at Reference B in FIG. 2.

In an alternate implementation, a user experience metric may be determined as a function of transactions a transaction rate such as total requests sent per second, number of hits/sec, number of errors/sec, etc. Instead of configuring a range of a number of users, the stress performance test may be configured with a range of a hit rates which may be increased based on feedback of crossing a user experience metric value threshold.

Computer System

FIG. 11 is a block diagram of a computer system on which the technology disclosed may be implemented. Computer system 1110 typically includes at least one processor 1114 that communicates with a number of peripheral devices via bus subsystem 1112. These peripheral devices may include a storage subsystem 1124 including, for example, memory devices and a file storage subsystem, user interface input devices 1122, user interface output devices 1120, and a network interface subsystem 1116. The input and output devices allow user interaction with computer system 1110.

Network interface subsystem 1116 provides an interface to outside networks, including an interface to corresponding interface devices in other computer systems.

User interface input devices 1122 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1110.

User interface output devices 1120 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as audio output devices. In general, use of the term "output device" is intended to include all possible types of devices and ways to output information from computer system 1110 to the user or to another machine or computer system.

Storage subsystem 1124 stores programming and data constructs that provide the functionality of some or all of the modules and methods described herein. These software modules are generally executed by processor 1114 alone or in combination with other processors.

Memory 1126 used in the storage subsystem can include a number of memories including a main random access memory (RAM) 1134 for storage of instructions and data during program execution and a read only memory (ROM) 1132 in which fixed instructions are stored. A file storage subsystem 1128 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1128 in the storage subsystem 1124, or in other machines accessible by the processor.

Bus subsystem 1112 provides a mechanism for letting the various components and subsystems of computer system 1110 communicate with each other as intended. Although bus subsystem 1112 is shown schematically as a single bus, alternative implementations of the bus subsystem may use multiple busses.

Computer system 1110 can be of varying types including a workstation, server, computing cluster, blade server, server farm, or any other data processing system or computing device. Due to the ever-changing nature of computers and networks, the description of computer system 1110 depicted in FIG. 11 is intended only as one example. Many other configurations of computer system 1110 are possible having more or fewer components than the computer system depicted in FIG. 11.

While the technology disclosed is by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the technology disclosed and the scope of the following claims.

The invention claimed is:

1. A method of understanding user experience under high loads and diverse regional traffic mix, the method including:

initiating a test using a hybrid test system including first simulated load generators and second web browser emulators that send a multitude of object requests related to a web page to a system under test from one or more user selected regions;

wherein the first simulated load generators:

generate object requests for at least one object on the web page, thereby simulating an object request load resulting from at least dozens of client-requestors; and report at least object response time and error rates responsive to the object requests; and wherein the second web browser emulators:

emulate a sequence of requests for multiple separately loadable object components of the web page from a plurality of the second web browser emulators; and report at least initial response time, object load time, and returned errors for the separately loadable components;

receiving reports of test result statistics from the first simulated load generators and the second web browser emulators; and reporting at least some of the test result statistics for display to a user.

2. The method of claim 1, wherein the reporting includes reporting a plurality of graphs depicting at least a number of simulated users, response times from the second web browser emulators, hit rates from the first simulated load generators, and error rates from the first simulated load generators.

3. The method of claim 1, further including reporting test result statistics from at least one of the second web browser emulators organized by requested object component and formatted to include a cascaded bar chart of initial response times and object load times for at least some of the separately loadable object components.

4. The method of claim 1, further including reporting test result statistics averaged from a plurality of the second web browser emulators operating on hardware in one of the user selected regions, organized by requested object component, and formatted to include a cascaded bar chart of object response times for at least some of the separately loadable object components.

5. The method of claim 1, further including reporting test result statistics from a plurality of the second web browser emulators operating on hardware in one of the user selected regions, organized by requested object component, and formatted to include a cascaded box-and-whisker chart of object response time distributions for at least some of the separately loadable object components.

6. The method of claim 1, further including reporting in multiple cascaded bar charts timing derived from reports of a plurality of the second web browsers under different system loads, wherein each cascaded bar chart illustrates the response times for at least some of the separately loadable object components.

7. The method of claim 3, further including:

receiving data indicating user selection of a bar in the cascaded bar chart; and responsive to the user selection, transmitting data representing an approximate visual appearance to a user of the web page components at a time after start of loading the web page corresponding to the user selected bar.

8. The method of claim 3, wherein the cascade bar chart further includes milestone indicators of events that change a visual appearance with a browser of the web page.

9. The method of claim 1, further including:
receiving data that indicates a browser to emulate from among a plurality of browsers that have different operating characteristics; and
using a web browser emulator corresponding to the indicated browser to emulate.

10. The method of claim 2, further including in the hit rates and the error rates results from both the first simulated load generators and the second web browser emulators.

11. The method of claim 2, further including filtering the graphs by user selected region.

12. The method of claim 2, further including:
using the hybrid test system from multiple user selected regions with both the first simulated load generators and the second web browser emulators operating on hardware in the multiple user selected regions; and
varying a mix of traffic from the multiple regions during the test.

13. A computer-implemented system that implements a method of understanding user experience under high loads and diverse regional traffic mix, the implementation including:
a processor and a memory coupled to the processor, the memory storing computer instructions that implement a method, including:
initiating a test using a hybrid test system including first simulated load generators and second web browser emulators that send a multitude of object requests related to a web page to a system under test from one or more user selected regions;
wherein the first simulated load generators:
generate object requests for at least one object on the web page, thereby simulating an object request load resulting from at least dozens of client-requestors; and
report at least object response time and error rates responsive to the object requests; and
wherein the second web browser emulators:
emulate a sequence of requests for multiple separately loadable object components of the web page from a plurality of the second web browser emulators; and
report at least initial response time, object load time, and returned errors for the separately loadable components;
receiving reports of test result statistics from the first simulated load generators and the second web browser emulators; and
reporting at least some of the test result statistics for display to a user.

14. The computer-implemented system of claim 13, wherein the reporting further includes reporting in a plurality of graphs at least a number of simulated users, response times from the second web browser emulators, hit rates from the first simulated load generators, and error rates from the first simulated load generators.

15. The computer-implemented system of claim 13, wherein the implementation further includes reporting test result statistics averaged from a plurality of the second web browser emulators operating on hardware in one of the user selected regions, organized by requested object component, and formatted to include a cascaded bar chart of object response times for at least some of the separately loadable object components.

16. The computer-implemented system of claim 13, wherein the implementation further includes reporting test result statistics from a plurality of the second web browser emulators operating on hardware in one of the user selected regions, organized by requested object component, and formatted to include a cascaded box-and-whisker chart of object response time distributions for at least some of the separately loadable object components.

17. The computer-implemented system of claim 13, wherein the implementation further includes reporting in multiple cascaded bar charts timing derived from reports of a plurality of the second web browsers under different system loads, wherein each cascaded bar chart illustrates the response times for at least some of the separately loadable object components.

18. The computer-implemented system of claim 13, wherein the implementation further includes:
using the hybrid test system from multiple user selected regions with both the first simulated load generators and the second web browser emulators operating on hardware in the multiple user selected regions; and
varying a mix of traffic from the multiple regions during the test.

19. A non-transitory computer readable medium that stores computer instructions that, when run on hardware, implement understanding user experience under high loads and diverse regional traffic mix, the implementation including:
initiating a test using a hybrid test system including first simulated load generators and second web browser emulators that send a multitude of object requests related to a web page to a system under test from one or more user selected regions;
wherein the first simulated load generators:
generate object requests for at least one object on the web page, thereby simulating an object request load resulting from at least dozens of client-requestors; and
report at least object response time and error rates responsive to the object requests; and
wherein the second web browser emulators:
emulate a sequence of requests for multiple separately loadable object components of the web page from a plurality of the second web browser emulators; and
report at least initial response time, object load time, and returned errors for the separately loadable components;
receiving reports of test result statistics from the first simulated load generators and the second web browser emulators; and
reporting at least some of the test result statistics for display to a user.

20. The non-transitory computer readable medium of claim 19, the implementation further including reporting in a plurality of graphs at least a number of simulated users, response times from the second web browser emulators, hit rates from the first simulated load generators, and error rates from the first simulated load generators.

21. The non-transitory computer readable medium of claim 19, the implementation further including reporting test result statistics from at least one of the second web browser emulators organized by requested object component and formatted to include a cascaded bar chart of object response times for at least some of the separately loadable object components.

22. The non-transitory computer readable medium of claim 19, the implementation further including:
receiving data indicating user selection of a bar in the cascaded bar chart; and
responsive to the user selection, transmitting data representing an approximate visual appearance to a user of the web page components at a time after start of loading the web page corresponding to the user selected bar.

23. The non-transitory computer readable medium of claim 19, wherein the cascade bar chart further includes milestone indicators of events that change a visual appearance with a browser of the web page.

24. The non-transitory computer readable medium of claim 19, the implementation further including:
receiving data that indicates a browser to emulate from among a plurality of browsers that have different operating characteristics; and
using a web browser emulator corresponding to the indicated browser to emulate.

25. The non-transitory computer readable medium of claim 21, further including in the hit rates and the error rates results from both the first simulated load generators and the second web browser emulators.

* * * * *